June 15, 1926.

L. W. CHUBB 1,588,525

ELECTRICAL MEASURING INSTRUMENT

Filed Sept. 12, 1921

WITNESSES:

John T. Hurml.
J A Procter

INVENTOR
Lewis Warrington Chubb
BY
Wesley G Carr
ATTORNEY

Patented June 15, 1926.

1,588,525

UNITED STATES PATENT OFFICE.

LEWIS WARRINGTON CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed September 12, 1921. Serial No. 499,915.

My invention relates to measuring devices and particularly to thermo-couple measuring devices.

One object of my invention is to provide means for neutralizing the differences of potential in a thermo-couple, caused by inaccuracy in the relation between the couple and a heater therefor.

Another object of my invention is to provide means for neutralizing the differences of potential in a thermo-couple incident to alternating-current traversing portions thereof.

Another object of my invention is to provide a device of the above indicated character that shall be simple and inexpensive to construct and effective in its operation.

In a certain type of thermo-couple, the elements thereof are arranged with the junction between the elements in as close to single point contact with a heater element or wire as may readily be effected. With the couple elements of small diameters, it is difficult to provide single point contact between the couple and a small heater wire. More frequently, the heater wire engages the elements at a plurality of points to cause a difference of potential in the couple circuit of relatively great magnitude compared to the thermally-generated electromotive force of the couple.

The above described structure, whether the heater is traversed by direct or alternating-current, introduces considerable error into the thermo-couple circuit by causing a portion of the heater-circuit current to traverse the couple circuit. However, in measuring alternating currents, for which my invention is more particularly intended, there are the additional usual features, such as mutual induction between the heater and thermo-couple circuits, which cause alternating currents to traverse the circuit of the couple and it is my aim to overcome all of the above mentioned objectionable features.

In practicing my invention, I provide a thermo-couple that is connected between an alternating-current circuit and a direct-current meter. Since the alternating current traversing a portion of the couple causes a difference of potential therein, the meter will not indicate accurately if it is responsive to the variations. In view of this, I provide a circuit that is connected in shunt relation to a portion of the heater or alternating-current circuit and having a potential drop equal and opposite to the drop in the couple incident to the inductance and resistance thereof. With this arrangement, the disturbing effect of the alternating current is not apparent on the indications of the meter.

Figure 1:
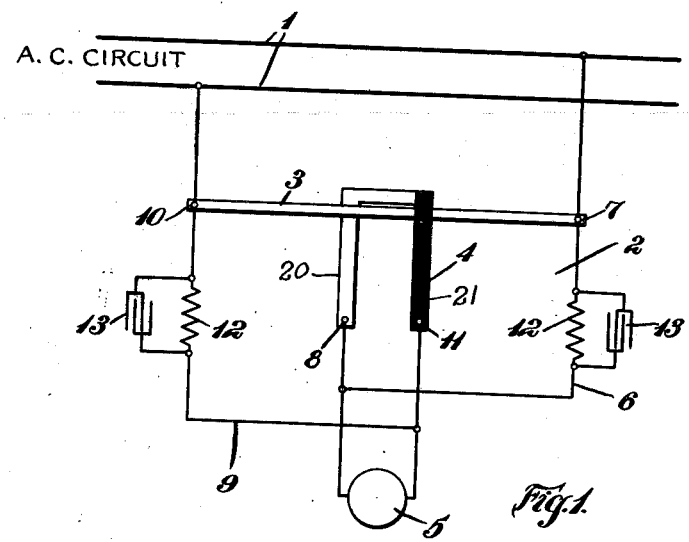
Figure 2:
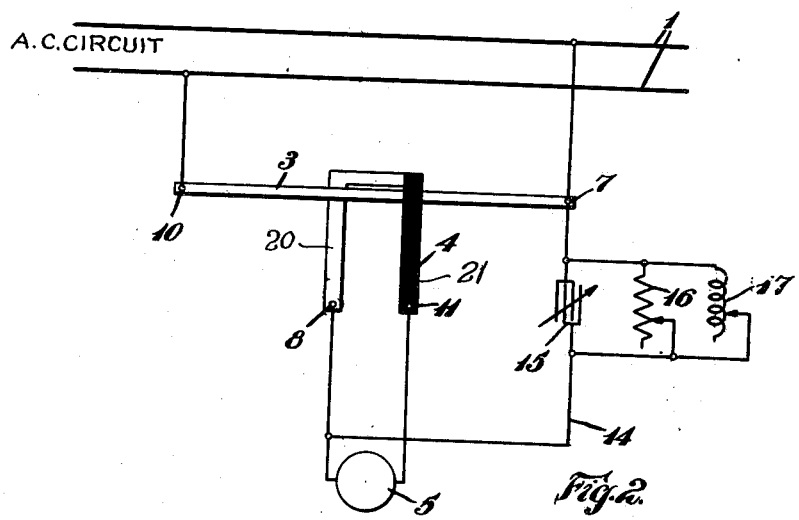
Figure 3:
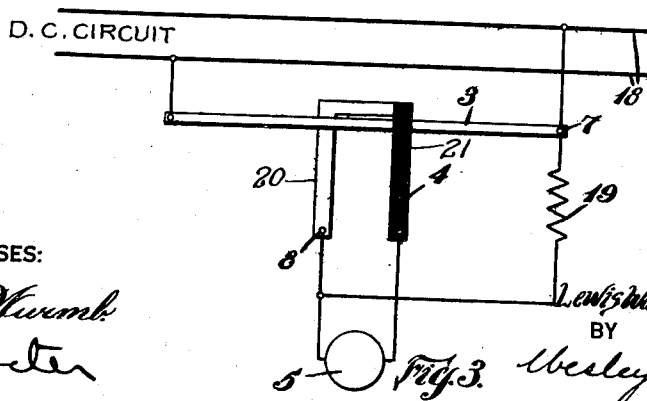

Figure 1 of the accompanying drawings is a diagrammatic view of a measuring device embodying my invention and;

Figs. 2 and 3 are diagrammatic views of measuring devices embodying modified forms of my invention.

In the form of my invention illustrated in Fig. 1, alternating-current circuit 1 is provided with a measuring device 2 for indicating the voltage thereof. A heater element 3 is connected across the circuit 1 and a thermo couple 4 is connected between the heater 3 and a direct-current indicating instrument 5. The thermo-couple 4 comprises elements or wires 20 and 21 of different metals, such as manganin and advance, that are arranged with the hot junction of the couple, in as nearly single point contact with the heater wire 3 as may readily be obtained. However, with the wires 3, 20 and 21 of delicate character and small diameter, it is difficult to obtain the above described relations, the couple more frequently engaging the heater wire 3 at a plurality of points whereby difference of potential is produced in the thermo-couple circuit which causes the instrument 5 to be inaccurate in its indications, or, in the case of instruments responsive to the alternating component, such as string galvanometers, there is a blurring of the indication.

In view of the above, I provide a circuit 6 that is connected from one terminal 7 of the heater 3 to the terminal 8 of the couple 4, and a second circuit 9 that is connected from the terminal 10 of the heater 3 to the terminal 11 of the couple 4. The circuits 6 and 9 severally comprise resistors 12 and condensers 13 connected in shunt relation with respect to each other and of such characteristics that the difference of potential therein is equal and opposite to the alternating difference of potential caused in the thermo-couple by the alternating voltage of the circuit 1. That is, when current is traversing the heater 3 in one direction, the difference of potential in the circuit 6 from the terminal 8 to the terminal 7 is equal and opposite to the difference of potential caused thereby in the thermo-couple circuit and when current is traversing the heater 3 in the opposite direction, the difference of potential in the circuit 9 from the terminal 11 to the terminal 10 is equal and opposite to the difference of potential caused thereby in the thermo-couple circuit. With this arrangement, current will traverse the meter 5 in accordance with the heat in, or value of, the current traversing the heater 3, and its indications will not be rendered inaccurate by reason of the superposed alternating difference of potential in the couple 4.

In Fig. 2 of the drawings, a circuit 14 is connected across the terminal 8 of the couple and the terminal 7 of the heater and comprises a variable condenser 15, a variable resistor 16 and a variable reactor 17 that are disposed in parallel relation with respect to each other. With this arrangement, a difference of potential equal and opposite to the difference of potential in the couple 4, caused by alternating current therein is obtained and the instrument 5 is responsive only to the thermal electromotive force generated by the couple incident to the current traversing the heater 3.

In Fig. 3, of the drawings, the heater 3 is heated from a direct-current source 18 of electromotive force and a resistor 19 is connected between the terminals 8 and 7. The resistor 19 is so chosen that no voltage, other than the thermally-generated voltage of the couple 4, will obtain on the instrument 5 when the resistance of the heater circuit between the point of contact of the element 21 therewith and the point 7 bears the same relation to the resistance of the resistor 19 as the resistance of the portion of the heater between the elements 20 and 21 bears to the resistance of the element 20 and its lead to the point of junction with the lead from the resistor 19. With this arrangement the thermo couple 4 may be connected in either direction without the need of reverse readings to cancel out the error incident to the difference of potential caused by engagement between the couple and the heater at more than a single point.

My invention is not limited to the specific arrangements illustrated, as it may be variously modified without departing from the spirit and scope of the invention, as set forth in the appended claims.

I claim as my invention:

1. The combination with a main circuit and a heater therein, of an auxiliary circuit including a thermo-couple co-operating with said heater to effect a thermally-derived difference of potential in the auxiliary circuit, and means for neutralizing a difference of potential other than said thermally-derived difference of potential in the auxiliary circuit.

2. The combination with a main circuit and a heater therein, of an auxiliary circuit including a thermo-couple co-operating with said heater to effect a thermally-derived difference of potential in the auxiliary circuit, and means for neutralizing an inductively-derived difference of potential in the auxiliary circuit.

3. The combination with a main circuit and a heater therein, of an auxiliary circuit including a thermo-couple co-operating with said heater to effect a thermally-derived difference of potential in the auxiliary circuit, and means for neutralizing an inductively-derived difference of potential and a difference of potential other than said thermally-derived difference of potential in said auxiliary circuit.

4. The combination with a main circuit and a heater therein, of an auxiliary circuit including a thermo-couple, the elements of which engage the heater at spaced points thereon, means responsive to current in the auxiliary circuit, and means compensating for errors in the auxiliary circuit caused by the spacing of said elements on the heater.

5. The combination with a main circuit and a heater therein, of an auxiliary circuit including a thermo-couple, the elements of which derive heat at points spaced along the heater, and means responsive to current in the auxiliary circuit, and means compensating for errors in the auxiliary circuit caused by the spacing of said elements relative to the heater.

6. The combination with a main circuit and a heater therein, of an auxiliary circuit including a thermo-couple, the elements of which are disposed adjacent to the heater with the junction of the couple spaced from the heater, and means compensating for errors in the auxiliary-circuit caused by the said relation of the couple to the heater.

In testimony whereof, I have hereunto subscribed my name this 25th day of August, 1921.

LEWIS WARRINGTON CHUBB.